(12) United States Patent
Soelberg

(10) Patent No.: US 10,275,048 B2
(45) Date of Patent: Apr. 30, 2019

(54) METHOD AND APPARATUS FOR CONFIGURING AND SELECTIVELY SENSING USE OF A DEVICE

(71) Applicant: STEELSERIES ApS, Frederiksberg (DK)

(72) Inventor: Tino Soelberg, Valby (DK)

(73) Assignee: STEELSERIES ApS, Frederiksberg (DK)

( * ) Notice: Subject to any disclaimer, the term of this patent is extended or adjusted under 35 U.S.C. 154(b) by 0 days.

(21) Appl. No.: 16/046,006

(22) Filed: Jul. 26, 2018

(65) Prior Publication Data

US 2018/0356910 A1 Dec. 13, 2018

Related U.S. Application Data

(63) Continuation of application No. 15/861,395, filed on Jan. 3, 2018, now Pat. No. 10,061,405, which is a
(Continued)

(51) Int. Cl.
| | |
|---|---|
| *G06F 3/02* | (2006.01) |
| *G06F 3/041* | (2006.01) |
| *G06F 3/0354* | (2013.01) |
| *G06F 3/0488* | (2013.01) |
| *A63F 13/24* | (2014.01) |
| *A63F 13/22* | (2014.01) |
| *A63F 13/214* | (2014.01) |
| *G06F 3/038* | (2013.01) |

(52) U.S. Cl.
CPC ........ *G06F 3/03543* (2013.01); *A63F 13/214* (2014.09); *A63F 13/22* (2014.09); *A63F 13/24* (2014.09); *G06F 3/038* (2013.01); *G06F 3/03547* (2013.01); *G06F 3/041* (2013.01); *G06F 3/0488* (2013.01)

(58) Field of Classification Search
CPC ............. G06F 3/044; G06F 2203/0383; G06F 3/03543; G06F 3/0338; G06F 3/033
See application file for complete search history.

(56) References Cited

U.S. PATENT DOCUMENTS

| 7,808,479 B1 | 10/2010 | Hotelling |
| 8,243,018 B2 | 8/2012 | Farag |
| (Continued) | | |

OTHER PUBLICATIONS

Apple, "Magic Mouse", http;//www.apple.com/magicmouse, Nov. 27, 2012.
(Continued)

*Primary Examiner* — Lixi C Simpson
(74) *Attorney, Agent, or Firm* — Guntin & Gust, PLC; Douglas Schnabel

(57) ABSTRACT

A system that incorporates the subject disclosure may include, for example, a method for subdividing a touch-sensitive interface of a mouse accessory into a first plurality of sectors for defining a first plurality of mouse buttons, where each sector of the first plurality of sectors corresponds to a distinct mouse button. The method can further include receiving a first signal from the touch-sensitive interface of the mouse accessory, detecting, from the first signal a selection of a sector of the first plurality of sectors, and generating a second signal indicating the selection of the sector. Additional embodiments are disclosed.

20 Claims, 12 Drawing Sheets

Related U.S. Application Data continuation of application No. 15/594,952, filed on May 15, 2017, now Pat. No. 9,891,721, which is a continuation of application No. 13/712,221, filed on Dec. 12, 2012, now Pat. No. 9,684,396.

(56) References Cited

U.S. PATENT DOCUMENTS

| | | |
|---|---|---|
| 9,891,721 B2 | 2/2018 | Soelberg |
| 2006/0274042 A1 | 12/2006 | Krah et al. |
| 2010/0245246 A1 | 9/2010 | Rosenfeld et al. |
| 2010/0328236 A1 | 12/2010 | Ma |
| 2011/0012835 A1* | 1/2011 | Hotelling ............... G06F 21/32 345/163 |
| 2011/0084904 A1 | 4/2011 | Tan et al. |
| 2012/0218185 A1 | 8/2012 | Chen |
| 2013/0027334 A1 | 1/2013 | Noma |
| 2013/0120262 A1 | 5/2013 | Piot et al. |
| 2017/0249026 A1 | 8/2017 | Soelberg |
| 2018/0129309 A1 | 5/2018 | Soelberg |

OTHER PUBLICATIONS

Ogihara, "1200dpi Thin Film LED Array by Silicon Photonics Technology", 2008 Electronic Components and Technology Conference; Sep. 2008.

Wikipedia, "Touchscreen", http://en.wikipedia.org/wiki/Touchscreen, Nov. 28, 2012.

* cited by examiner

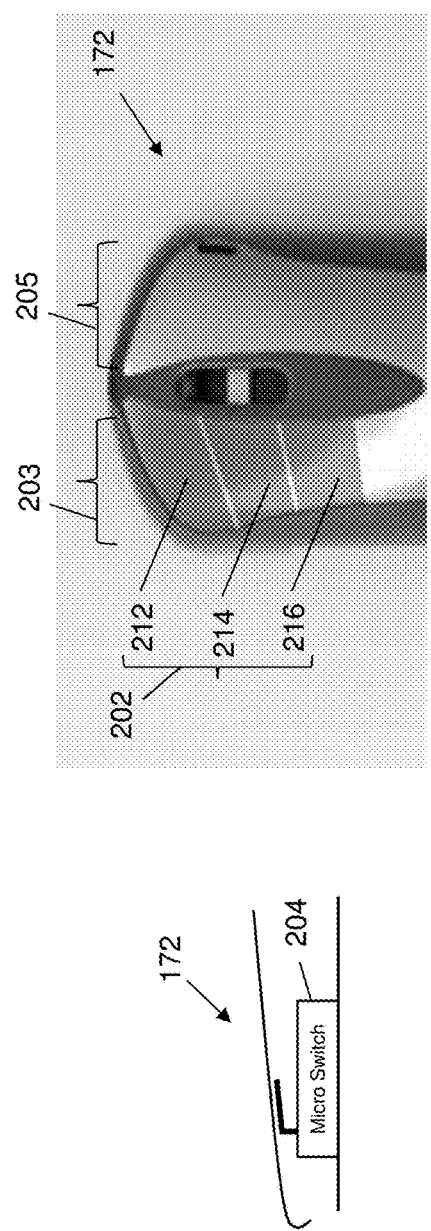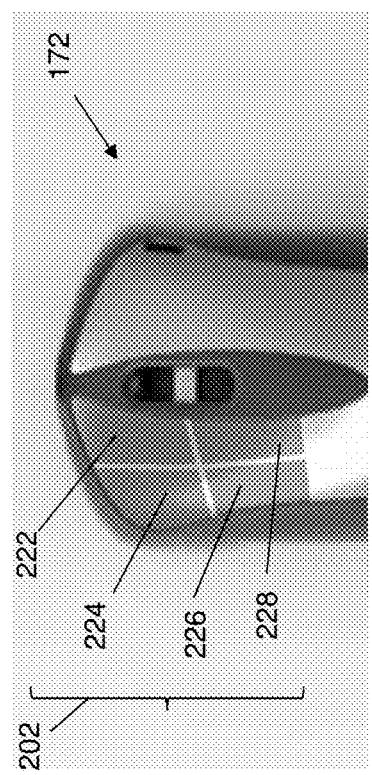

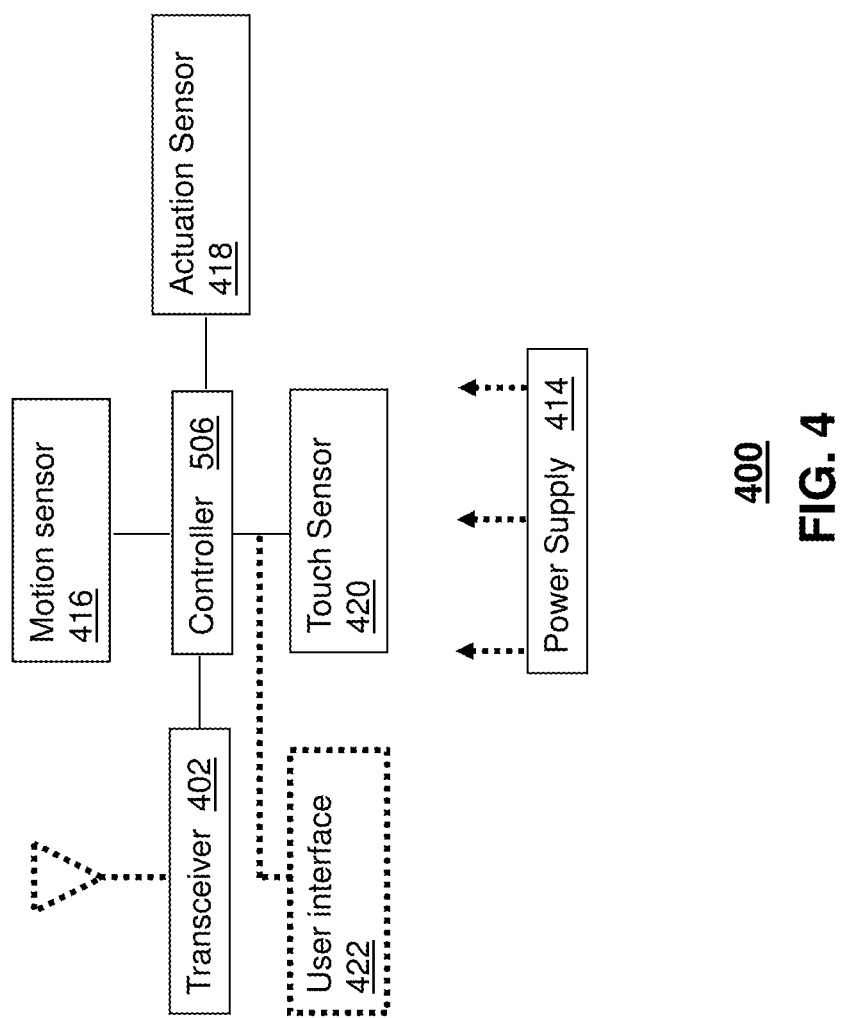

500

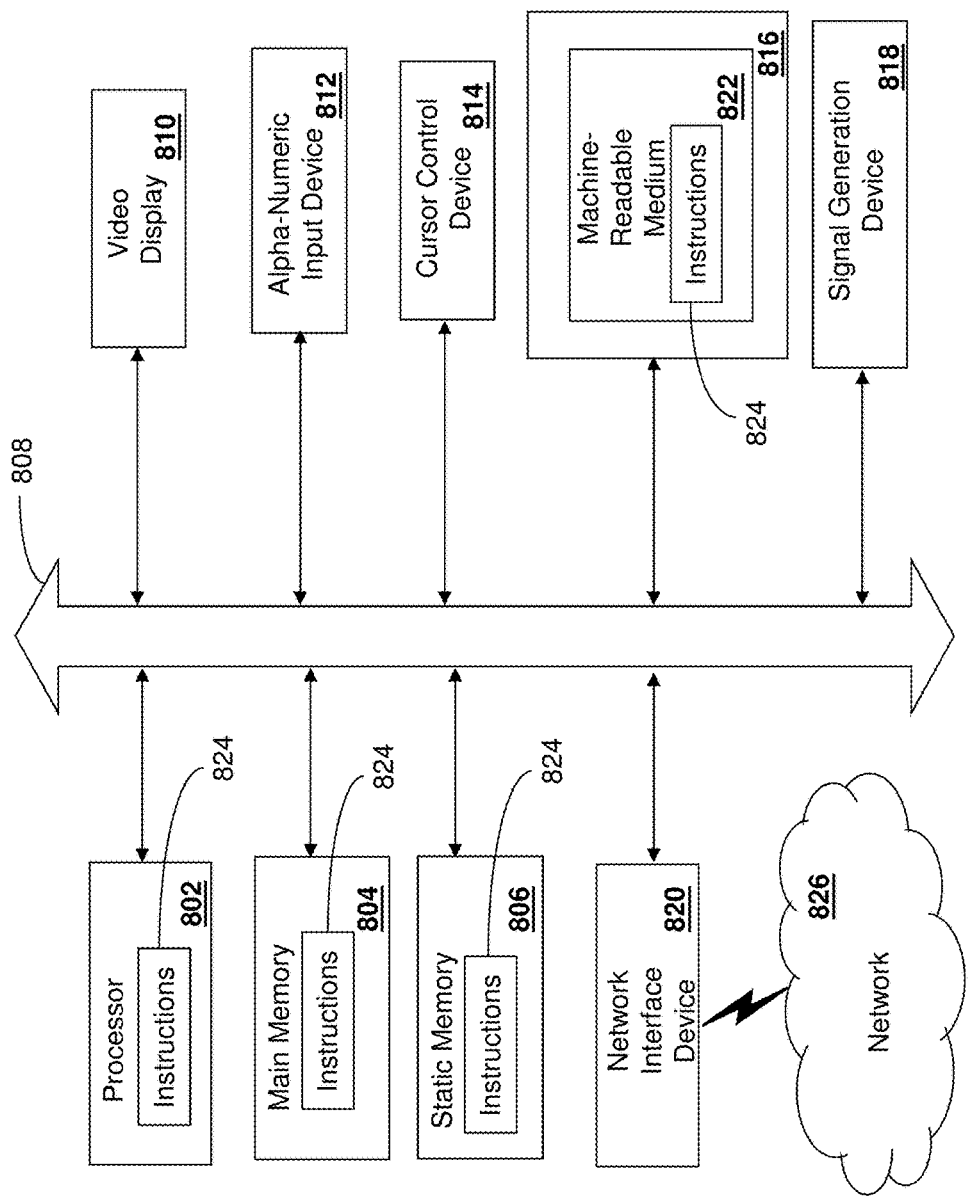

METHOD AND APPARATUS FOR CONFIGURING AND SELECTIVELY SENSING USE OF A DEVICE

CROSS-REFERENCE TO RELATED APPLICATIONS

This application is a continuation of U.S. patent application Ser. No. 15/861,395 filed on Jan. 3, 2018, which is a continuation of U.S. patent application Ser. No. 15/594,952 (now U.S. Pat. No. 9,891,721) filed on May 15, 2017, which is a continuation of U.S. patent application Ser. No. 13/712,221 (now U.S. Pat. No. 9,684,396) filed on Dec. 12, 2012. The contents of each of the foregoing is/are hereby incorporated by reference into this application as if set forth herein in full.

FIELD OF THE DISCLOSURE

The subject disclosure relates generally to a method and apparatus for configuring and selectively sensing use of a device.

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a mobile phone with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein:

FIG. 2A depicts a first illustrative embodiment of a computer mouse including a touch-sensitive interface;

FIG. 2B depicts a second illustrative embodiment of a computer mouse including a touch-sensitive interface;

FIG. 4 depicts an illustrative embodiment of a communication device;

FIG. 8 depicts an illustrative diagrammatic representation of a machine in the form of a computer system within which a set of instructions, when executed, may cause the machine to perform any one or more of the methodologies disclosed herein.

DETAILED DESCRIPTION

Figure 1A:
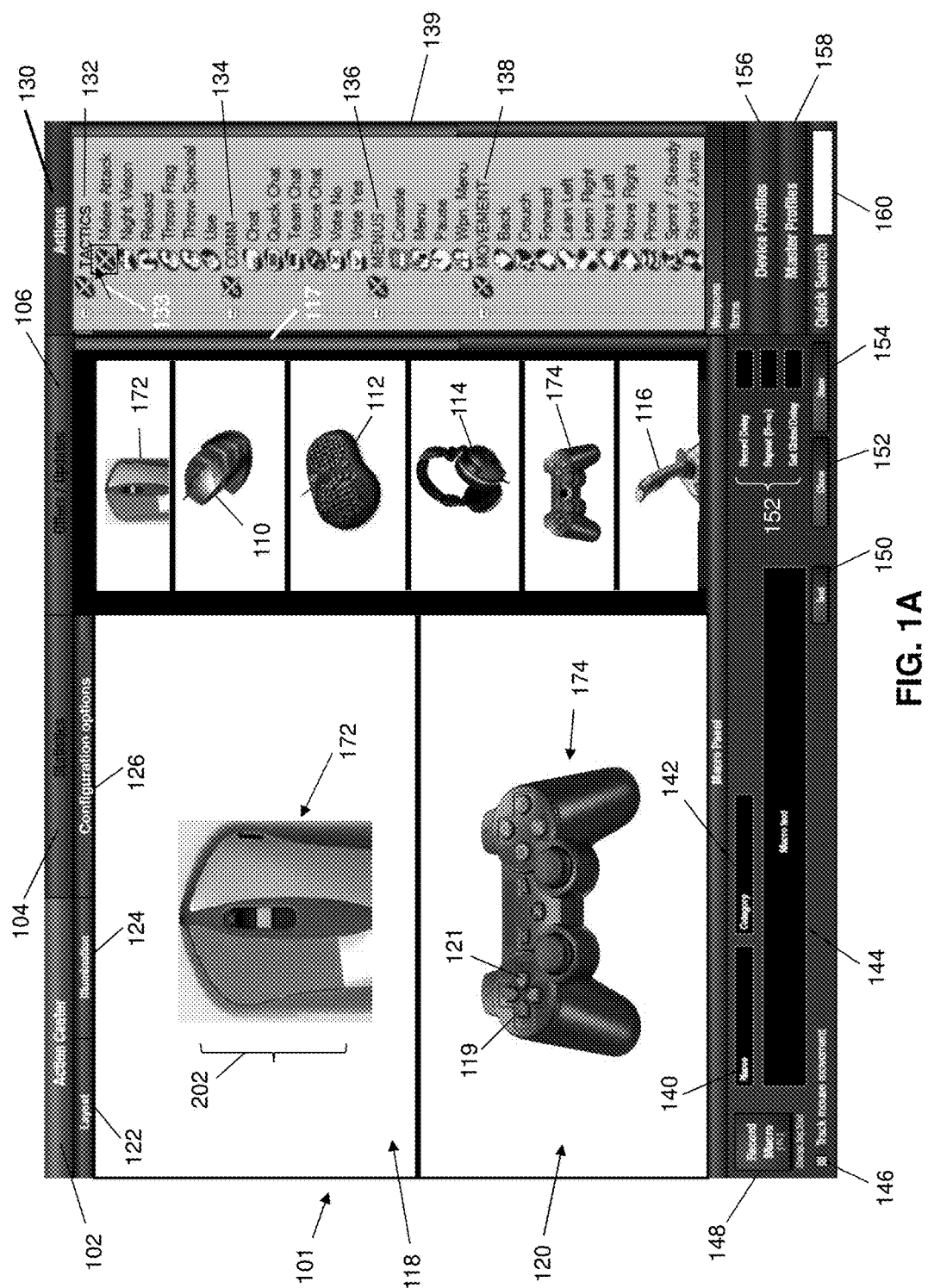
FIG. 1A depicts a first illustrative embodiment of a Graphical User Interface (GUI) generated by an Accessory Management Software (AMS) application according to the subject disclosure.

The subject disclosure describes, among other things, illustrative embodiments for configuring buttons on a device such as a computer mouse. Other embodiments are contemplated by the subject disclosure.

One embodiment of the subject disclosure includes a computer mouse including a touch-sensitive interface, a memory to store instructions, and a processor coupled to the touch-sensitive interface and the memory. Responsive to executing the instructions, the processor can perform operations including subdividing the touch-sensitive interface into a first plurality of sectors for defining a first plurality of mouse buttons, where each sector of the first plurality of sectors corresponds to a distinct mouse button, receiving a first signal from the touch-sensitive interface, detecting from the first signal a selection of a sector of the first plurality of sectors, and transmitting to a computing device a second signal indicating the selection of the sector.

One embodiment of the subject disclosure includes a computer-readable storage medium having computer instructions which when executed by a processor cause the processor to perform operations including subdividing a touch-sensitive interface of a mouse accessory into a first plurality of sectors for defining a first plurality of mouse buttons, where each sector of the first plurality of sectors corresponds to a distinct mouse button, receiving a first signal from the touch-sensitive interface of the mouse accessory, detecting from the first signal a selection of a sector of the first plurality of sectors, and transmitting a second signal indicating the selection of the sector.

One embodiment of the subject disclosure includes a method for subdividing a touch-sensitive interface of a mouse accessory into a first plurality of sectors for defining a first plurality of mouse buttons, where each sector of the first plurality of sectors corresponds to a distinct mouse button. The method can further include receiving a first signal from the touch-sensitive interface of the mouse accessory, detecting, from the first signal a selection of a sector of the first plurality of sectors, and generating a second signal indicating the selection of the sector.

FIGS. 1-2 depict illustrative embodiments of a Graphical User Interface (GUI) generated by an Accessory Management Software (AMS) application according to the subject disclosure. The AMS application can be executed by a computing device such as a desktop computer, a laptop computer, a server, a mainframe computer, a gaming console, a gaming accessory, or portions of the AMS applications can be executed by combinations of these computing devices. The AMS application can also be executed by portable computing devices such as a cellular phone, a personal digital assistant, a smartphone, a tablet, or a media player. Other devices with suitable computing resources can be used. The AMS application can be used for configuring accessories such as computer mice, gaming controllers, or other devices, and for substituting stimuli generated by these devices as will be described by the methods of FIGS. 5A-5B, 6 and 7A-7B.

FIG. 2A depicts a first illustrative embodiment of a computer mouse 172 including a touch-sensitive interface 202. The computer mouse 172 can comprise two mechanically depressible buttons 203 and 205. Depression of the left or the right mechanical buttons 203, 205 can be detected by a micro switch 204 as shown in a side view of the computer mouse 172. The left mechanical button 203 can also include on a top surface having three electrically isolated capacitive sensors 212, 214, and 216 for sensing touch by a user's finger. Each of the electrically isolated capacitive sensors 212, 214, and 216 can be mapped into three distinct sectors that can be treated as three distinct touch-sensitive mouse buttons. The left mechanical button 203 can thus be treated as three mouse buttons 212, 214, 216 detectable by the position of the user's finger.

If a user places a finger on button 212 and depresses the left mechanical button 203 while maintaining his/her finger at button 212, the micro switch 204 will generate an actuation signal, while the capacitive sensor will generate another signal associated with sector 212 indicating that the user's finger is at the mouse button associated with this sector. The combined signal can be transmitted over a cable (e.g., USB cable) or a wireless interface to a computer (not shown) communicatively coupled to the computer mouse 172. Alternatively, the computer mouse 172 can include a processor such as a microcontroller, or microprocessor that executes instructions stored in a memory to process the actuation signal and the signal generated by the capacitive sensor. The processor can then transmit signals to the computer.

FIG. 2B depicts a second illustrative embodiment of the computer mouse 172. In this embodiment, the computer mouse 172 utilizes a micro switch 204 for each of the left and right mechanical buttons 203, and 204. The touch-sensitive interface 202, however, is subdivided in four electrically isolated capacitive sensing regions that can be mapped to four sectors 222, 224, 226 and 228. As such, the left mechanical button 203 can represent four mouse buttons depending on where the user places his/her finger when depressing the left mechanical button 203. The generation of the same signals discussed above (actuation signal and capacitive sensor signal) are applicable in this embodiment with the exception that the capacitive sensor signal can identify one of four touch-sensitive mouse buttons rather than one of three touch-sensitive mouse buttons illustrated in FIG. 2A.

Figure 2C:
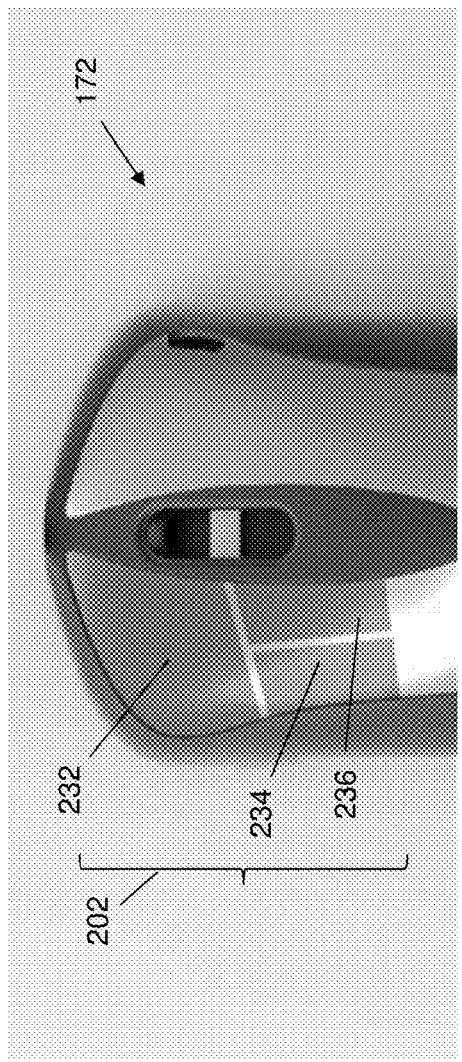
FIG. 2C depicts a third illustrative embodiment of a computer mouse including a touch-sensitive interface.

FIG. 2C depicts a third illustrative embodiment of the computer mouse 172. In this embodiment, the touch-sensitive interface 202 is subdivided into three electrically isolated capacitive sensing regions that can be mapped to three sectors 232, 234 and 236. This embodiment provides yet another configuration for mouse buttons that are sensed by finger placement and depression of the left mechanical button 203.

Figure 1B:
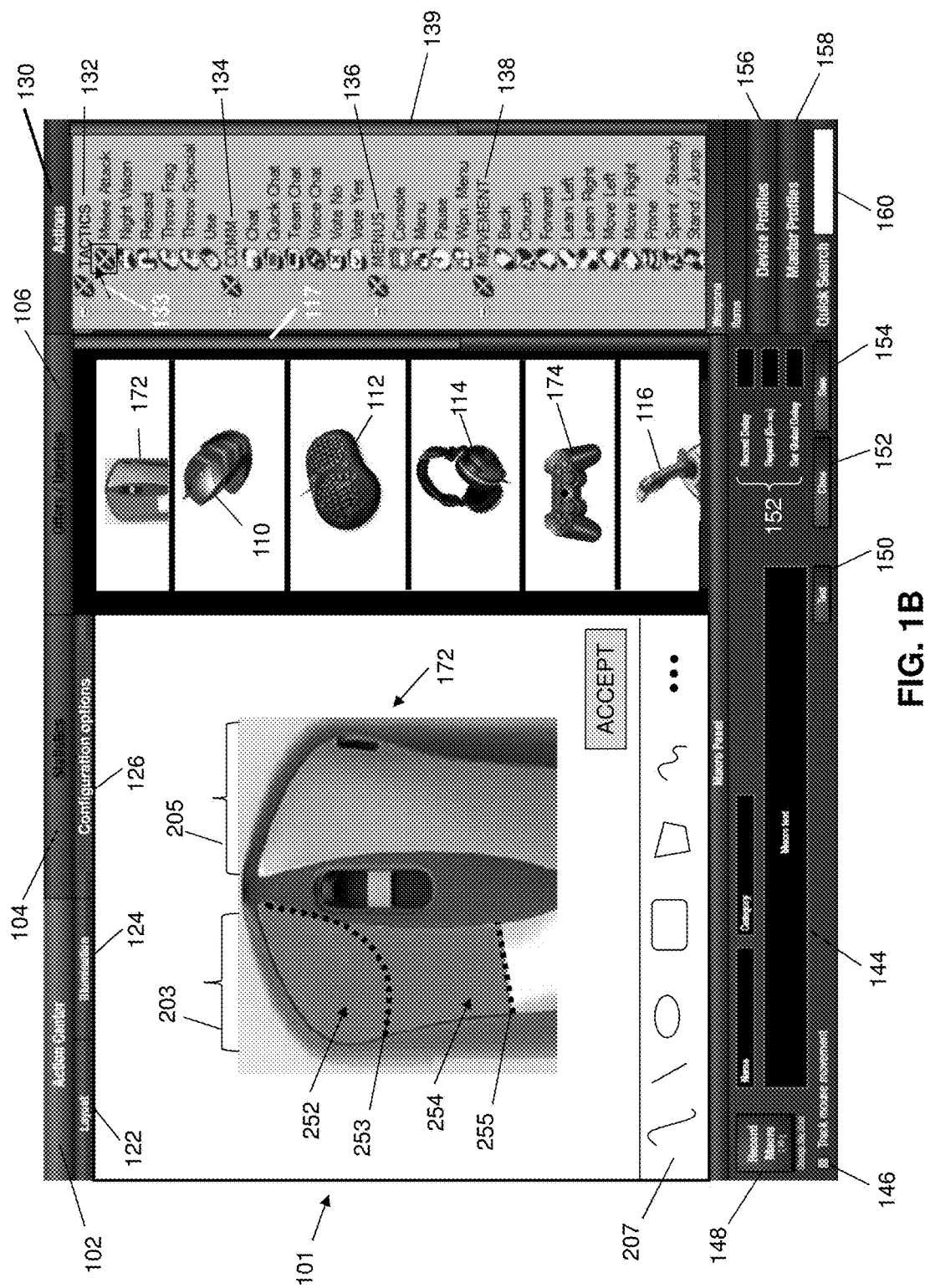
FIG. 1B depicts a second illustrative embodiment of a GUI generated by the AMS application according to the subject disclosure.
Figure 2D:
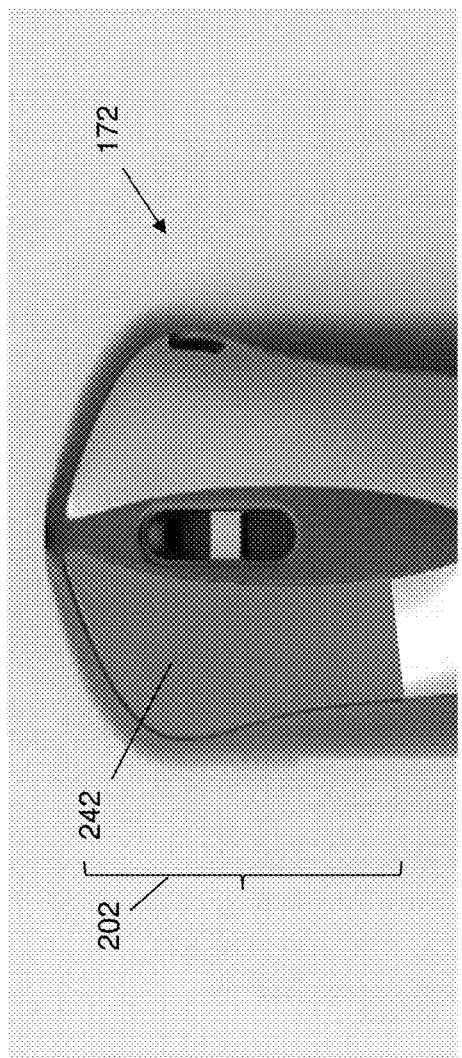
FIG. 2D depicts a fourth illustrative embodiment of a computer mouse including a touch-sensitive interface.

FIG. 2D depicts a fourth illustrative embodiment of the computer mouse 172. In this embodiment there is only one capacitive sensing region 242. In this embodiment, a user can identify with user input at a GUI as shown in FIG. 1B virtual regions which can be mapped into mouse buttons. With drawings tools 207, a user can draw two or more virtual regions 252, 254 to identify desirable mouse buttons. Since the capacitive sensing region 242 can provide a coordinate signal indicating where a user places his/her finger, it is possible for a user to identify by way of the GUI of FIG. 1B any number of virtual regions that correspond to touch-sensitive mouse buttons. In one embodiment, the user can imagine where these regions are located and thereby selectively choose a mouse button. With sufficient trial and error practice sessions, a user can grow accustom to sensing where the virtual regions are located without visual assistance. In another embodiment, a thin film illuminating material, such as a thin film light emitting diode (LED) array, can be overlaid on the capacitive sensing region 242. The thin film LED array can in turn be controlled to illuminate portions or outlines of the virtual regions to identify the mouse buttons constructed by the user in the GUI of FIG. 1B. The thin film LED array can be controlled by a processor of the computer mouse 172 or the computer communicatively coupled thereto over a wired or wireless interface with suitable control circuits.

It is noted that the above embodiments for FIGS. 2A-2D can be applied to the right mechanical button 205. Accordingly, the computer mouse 172 can have one or both mechanical buttons 203, 205 with touch-sensitive mouse buttons at a top surface with the same or different geometric configurations. It is further noted that other technologies for sensing touch such as a resistive, surface acoustic wave, surface capacitance, projected capacitance, mutual capacitance, self-capacitance, infrared grid, infrared acrylic projection, optical imaging, dispersive signal technology, acoustic pulse recognition, as well as next generation sensing technologies can be used in place of the foregoing embodiments of the computer mouse 172 in FIGS. 2A through 2D.

Figure 3:
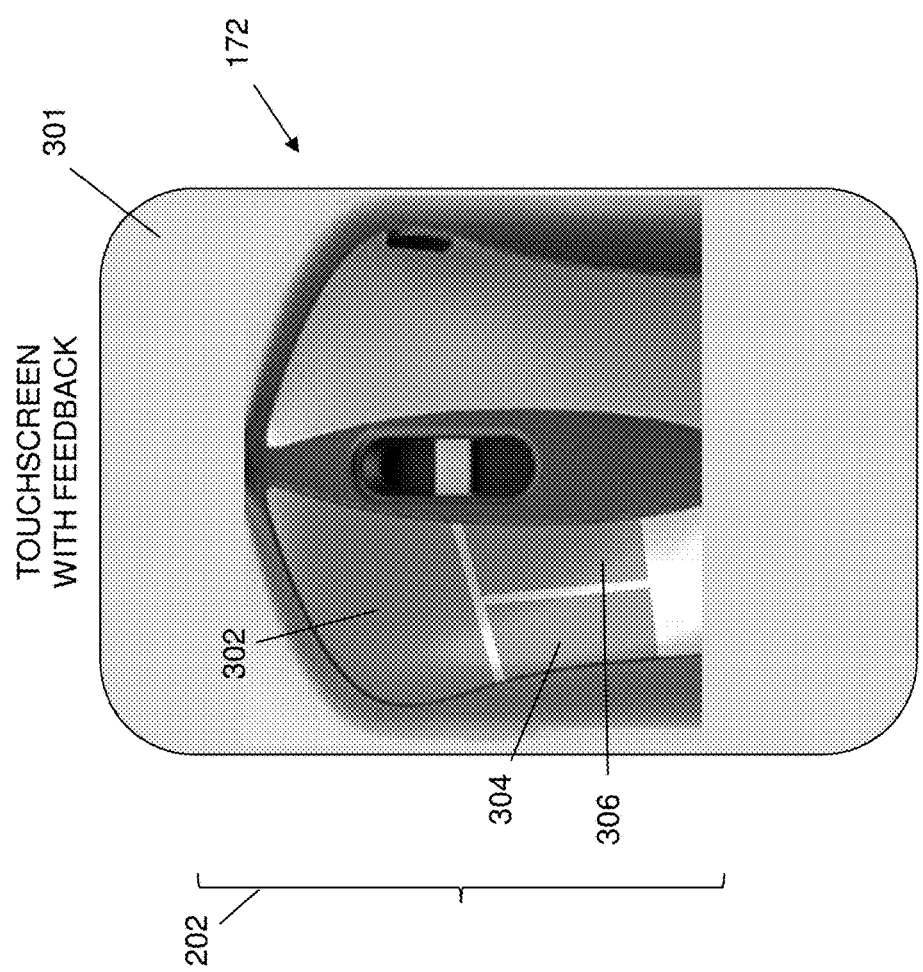
FIG. 3 depicts an illustrative embodiment of a touch-sensitive display configured as a computer mouse.

FIG. 3 depicts an illustrative embodiment of a touch-sensitive display 301 configured as the computer mouse 172. In this embodiment, a user can utilize the GUI of FIG. 1B to draw the shape of a mouse on the touch-sensitive display 301, and identify sectors 302, 304, and 306 as mouse buttons. For touch-sensitive displays with feedback, the depression of a finger in any of sectors 302, 304, or 306, which can be detected by a size in a contact area between the finger and the touch-sensitive display 301, can be responded to with a vibration, an audible click, or some other form of feedback to indicate to the user that a mouse depression has been detected. In this embodiment, the touch-sensitive display 301 can be configured to present the outlines of the mouse to readily depict the position of the customized mouse buttons.

The above embodiments of the computer mouse 172 can also include laser tracking technology to track the movement of the mouse in a two-dimensional plane. One or more accelerometers, gyroscopes, and/or magnetometers can also be included in the computer mouse 172 to track movement in three dimensional space.

FIG. 4 depicts an illustrative embodiment of a device 400. Device 400 can serve in whole or in part as an illustrative embodiment of the computer mice 172 depicted in FIGS. 2A-2D, and 3. The device 400 can comprise a wireline and/or wireless transceiver 402 (herein transceiver 402), a user interface (UI) 404, a power supply 414, a motion sensor 416, an actuation sensor 418, a touch sensor 420, and a controller 406 for managing operations thereof. The transceiver 402 can support short-range wireless access technologies such as Bluetooth or WiFi, long-range wireless access technologies such as cellular, and/or wireline technologies such as USB cable technologies.

The power supply 414 can utilize common power management technologies such as replaceable or rechargeable batteries, supply regulation technologies, and charging system technologies for supplying energy to the components of the device 400 t. Alternatively, the charging system can utilize external power sources such as DC power supplied over a physical interface such as a USB cable.

The motion sensor 416 can utilize motion sensing technology such as an accelerometer, a gyroscope, a magnetometer or other suitable motion sensing technology to detect movement of the device 400 in two or three-dimensional space. The actuation sensor 418 can utilize a micro switch such as illustrated in FIG. 2A for detecting depressions. Alternatively, a measure of surface area of a finger depressed on a touch-sensitive interface can be used to detect a depression. The touch sensor 420 can utilize capacitive sensing technology (with or without electrically isolated regions) such as illustrated above for detecting where a user's finger is touching a surface of the device. A user interface 422 can be added to the device 400 that can include a display (e.g., LCD or OLED display), an audio system for conveying audible sounds, and a keypad interface for controlling functions of the device.

The controller 406 can utilize computing technologies such as a microprocessor, a digital signal processor (DSP), and/or an application specific integrated circuit with associated storage memory such as Flash, ROM, RAM, SRAM, DRAM or other storage technologies for storing and executing instructions therefrom.

Figure 5A:
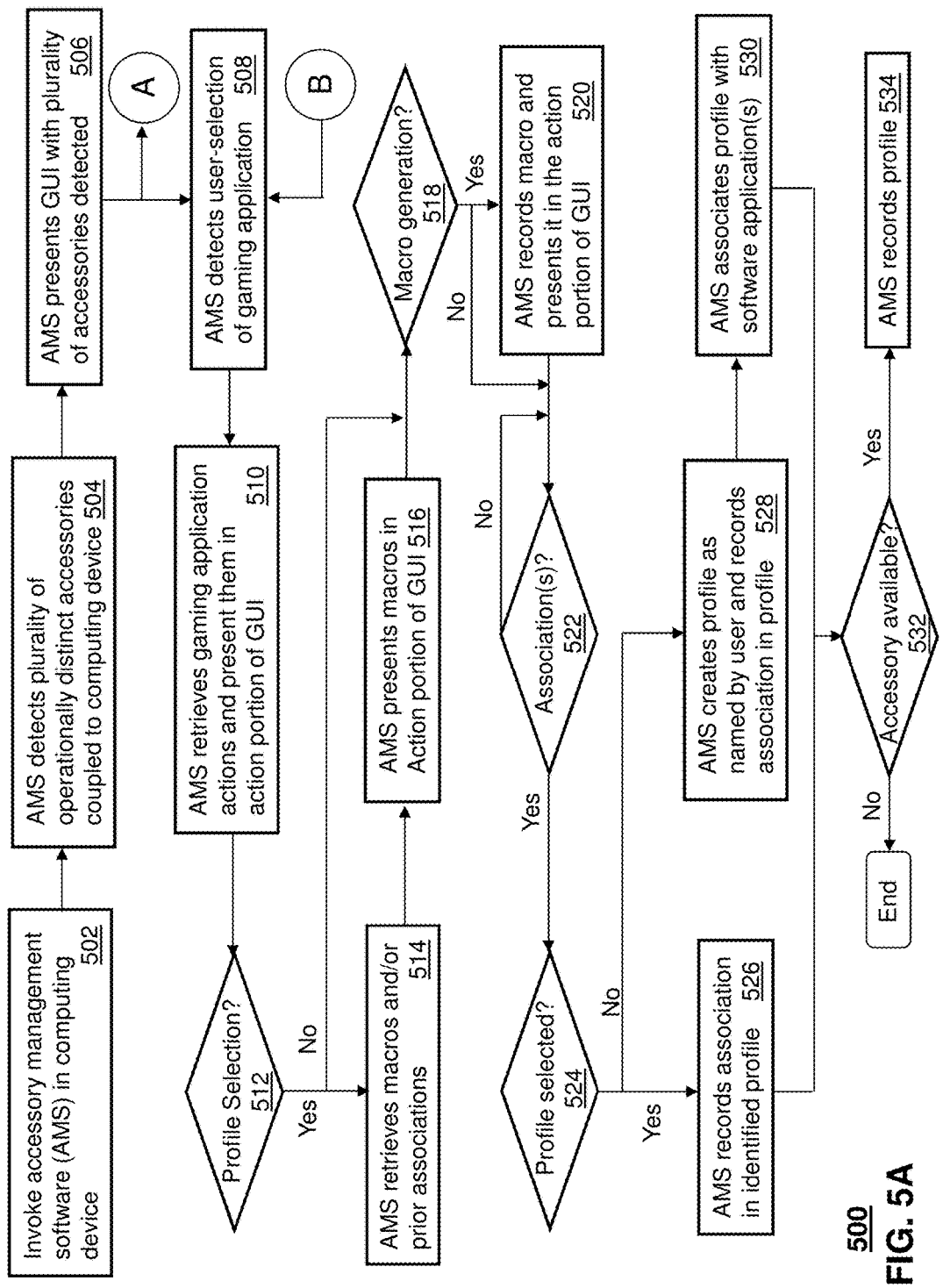
FIG. 5A depicts an illustrative embodiment of a first method utilized in the subject disclosure.
Figure 5B:
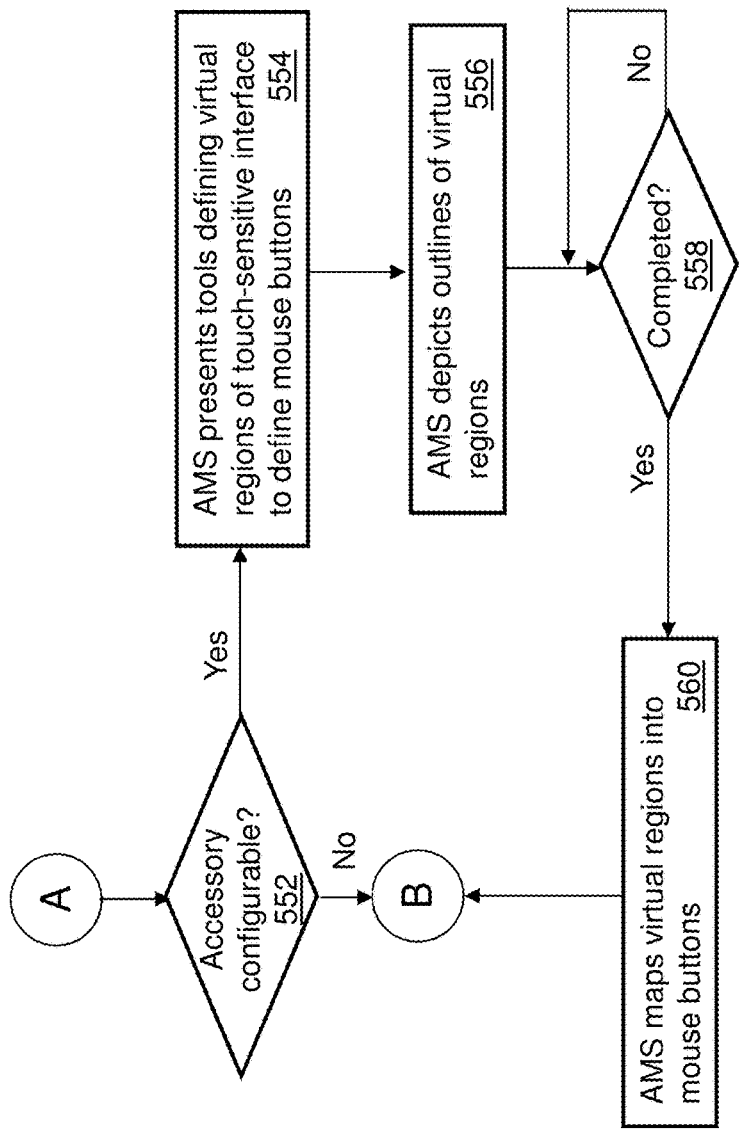
FIG. 5B depicts an illustrative embodiment of a second method utilized in the subject disclosure.
Figure 6:
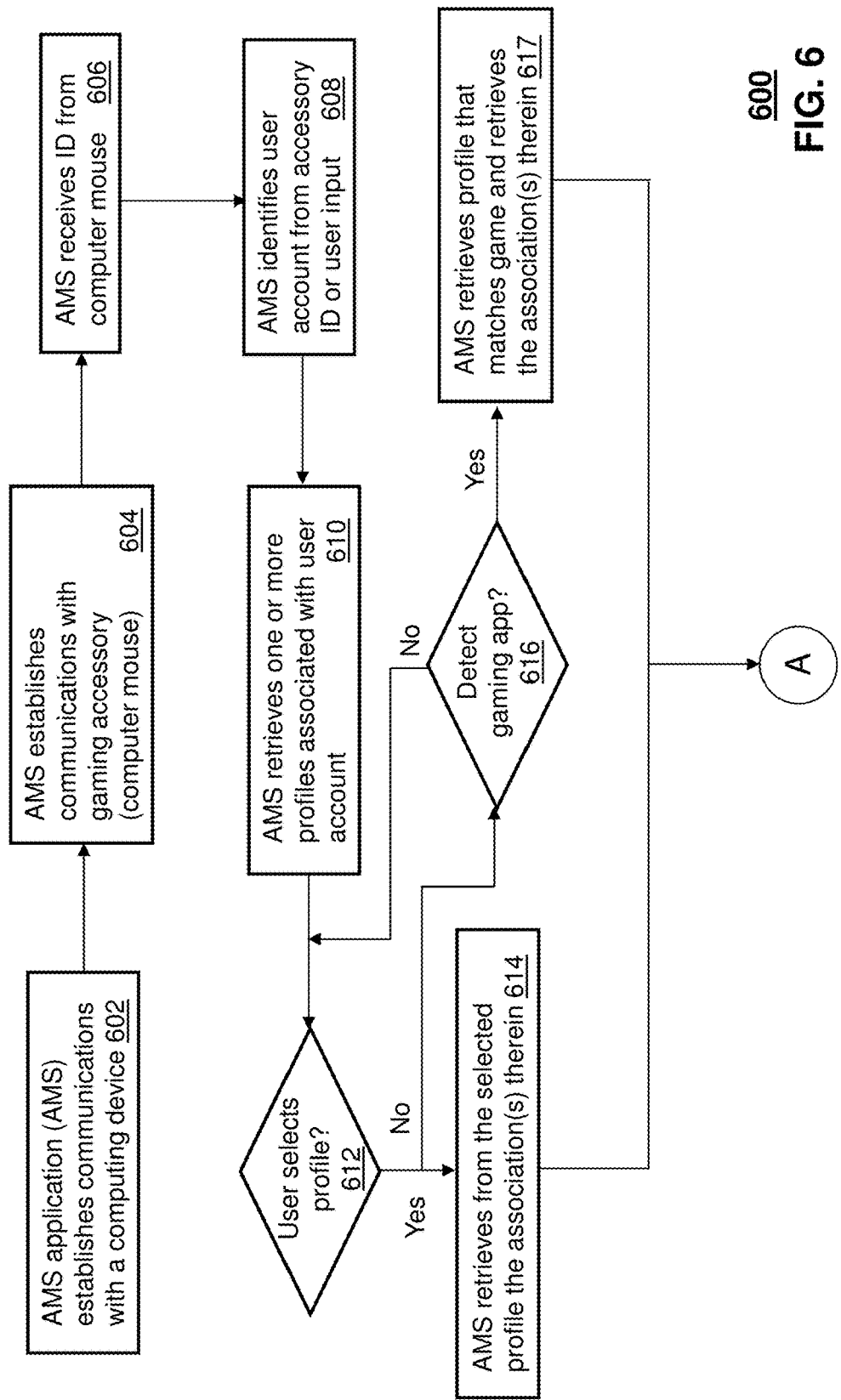
FIG. 6 depicts an illustrative embodiment of a third method utilized in the subject disclosure.

FIGS. 5-7 depict methods 500-700 describing illustrative embodiments of the AMS application referred to in FIGS. 1A-1B. Method 500 can begin with step 502 of FIG. 5A in which the AMS application is executed in a computing device such as a desktop or laptop computer, a remote server, a gaming console or a portable communication device such as a cellular phone. The invocation step can result from a user selection of the AMS application from a menu or iconic symbol presented on a screen of the device by an operating system (OS) managing operations thereof. In step 504, the AMS application can detect by way of drivers in the OS a plurality of operationally distinct accessories communicatively coupled to the computing device. The accessories can be coupled to the computing device by a tethered interface (e.g., USB cable), a wireless interface (e.g., Bluetooth or WiFi), or combinations thereof.

In the present context, an accessory can represent any type of device which can be communicatively coupled to the computing device (or that is an integral part of the computing device) and which can control aspects of the OS and/or a software application operating in the computing device. An accessory can represent for example a computer mouse, a smartphone, a keyboard, a touch screen display, a gaming pad, a gaming controller, a joystick, a microphone, or a headset with a microphone just to mention a few.

In step 506, the AMS application presents a GUI 101 such as depicted in FIG. 1A. The GUI 101 presents accessories 110-114, 116, 172, 174 in a scrollable section 117. One or more of these accessories can be selected by a user with a mouse pointer. In this illustration, the computer mouse 172 and the gaming controller 174 were selected for customization. The AMS application presents the computer mouse 172 and the gaming controller 174 in split windows 118, 120, respectively, to assist the user during the customization process.

Prior to step 508, the AMS application can proceed to step 552 of FIG. 5B. In this step, the AMS application can determine if the selected accessory is a configurable computer mouse such as the computer mouse 172 of FIG. 2D or FIG. 3. In the present illustration, the computer mouse 172 has the "contiguous" touch-sensitive interface 202 illustrated in FIG. 2D. The AMS application can detect that the touch sensitive interface 202 can be configured with virtual regions, which can be mapped into mouse buttons customized by user input. The AMS application can make this determination based on identification information received from the computer mouse 172 such as a model number, serial number or other identifier supplied by a manufacturer of the computer mouse 172.

Once such a determination is made, the AMS application can proceed to step 554 where it presents drawing tools 207 to a user. With the drawing tools, the user can draw virtual boundaries such as references 253 and 255 to depict at step 556 virtual regions 252 and 254, respectively, as shown in FIG. 1B. Once the user has satisfactorily defined such regions, the user can select the accept button shown in the GUI of FIG. 1B, which is detected at step 558, directing the AMS application to proceed to step 560 to map the virtual regions 252 and 254 into mouse buttons, which it can store in a profile associated with the computer mouse 172. For the computer mice 172 of FIGS. 2A, 2B and 2C, the AMS application proceeds from step 552 back to step 508 since for these devices, the sectors representing touch-sensitive mouse buttons are pre-configured in the computer mouse 172 by the manufacturer of the device. Accordingly, the AMS application does not present the user an option to perform customization at steps 554-560.

Once the AMS application has performed the method of FIG. 5B for customizable accessories, the AMS application proceeds to step 508 of FIG. 1A. In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left mechanical button 203 at virtual region 252 of the computer mouse 172 can be configured to represent the tactical action "Reload", while a simultaneous depressions of both mechanical buttons 203, 205 can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., touch-sensitive mouse buttons) of the computer mouse 172 to make an association with an input function of one of these accessories. Actions of one accessory can also be associated with another accessory that is of a different category or kind. For example, key depressions "Ctrl A" of a keyboard can be associated with one of the buttons of the computer mouse 174 (e.g., the virtual button 254).

Thus, when the left mechanical button 203 is depressed with a finger at virtual button 254, the stimulus signal that is generated by the computer mouse 174 can be substituted by the AMS application with "Ctrl A". In another embodiment, the Melee Action can be associated with a combination of key button presses (e.g., simultaneous depression of the left and right buttons 119, 121 of the gaming controller 174, or a sequence of button depressions: two rapid left button depressions followed by a right button depression).

In yet another embodiment, the Melee Action can be associated with movement of the gaming controller 174 such as, for example, rapid movement or shaking of the gaming controller 174. In a further embodiment, the AMS application can be adapted to make associations with two dimensional or three dimensional movements of the gaming controller 174 (or the computer mouse 172) according to a gaming venue state. For example, suppose the player's avatar enters a fighter jet. In this gaming venue state, moving the left navigation knob of the gaming controller 174 forward can be associated by the AMS application with controlling the throttle of the jet engines. Rapidly moving the gaming controller 174 downward can represent release of munitions such as a bomb.

In a gaming venue state where the gamer's avatar has entered a building, lifting of the gaming controller 174 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 174, recordable selections of buttons of the computer mouse 172, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 210, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more touch-sensitive mouse buttons 252 or 254 of the computer mouse 172, buttons of the gaming controller 174, etc.).

In step 522, the AMS application can respond to drag and drop associations of actions and input functions of the computer mouse 172. Associations can also be made based on the two or three dimensional movements of the computer mouse 172. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the computer mouse 172 can result in different substitutions based on the gaming venue state detected by the AMS application.

Once the associations have been recorded in a profile, the AMS application can determine in step 532 which of the accessories shown illustratively in FIGS. 1A-1B can store in memory profiles and thereby perform their own stimulus substitutions. If the AMS application detects that the accessories (e.g., computer mouse 172, gaming controller 174) are communicatively coupled to a computing device from which the AMS application is operating (e.g., gaming console) and can store profiles, the AMS application can proceed to step 534 of FIG. 5 where it submits the profile and its contents for storage in one of the accessories (e.g., a memory of the computer mouse 172). Once the computer mouse 172 is programmed with the profile, the computer mouse 172 can on its own perform stimuli substitutions according to the associations recorded by the AMS application in the profile. Alternatively, the AMS application can store the profile in the computing device and perform substitutions of stimuli supplied by the computer mouse 172 according to associations recorded in the profile by the AMS application.

FIG. 6 depicts a method 600 for illustrating the operations of the AMS application during execution of a software application such as a video game. The AMS application can be operating in whole or in part from the computer mouse 172, a gaming console, a desktop computer, or a remote server. For illustration purposes, it is assumed the AMS application operates from a desktop computer.

In this illustration, the desktop computer orchestrates video and audio processing via a monitor and an audio system. The AMS application facilitates communications in steps 602 and 604 between the desktop computer and the computer mouse 172. These steps can represent for example a user starting the AMS application from the desktop computer and/or the user inserting at a USB port of the desktop computer a connector of a USB cable tethered to the computer mouse 172, which invokes the AMS application. In step 606, the computer mouse 172 can in turn provide the AMS application an accessory ID. With the accessory ID (or with user input) the AMS application can identify in step 608 a user account associated with the computer mouse 172. In step 610, the AMS application can retrieve one or more profiles associated with the user account.

In step 612, the user can be presented by way of the monitor profiles available to the user to choose from for utilizing the computer mouse 172. If the user makes a selection, the AMS application proceeds to step 614 where it retrieves from the selected profiles the association(s) stored therein. If a selection is not made, the AMS application can proceed to step 616 where it can determine whether a video game is operating from the desktop computer or whether the desktop computer is communicating with a remote server executing the video game. If a video game is detected, the AMS application proceeds to step 617 where it retrieves a profile that matches the video game detected. As noted earlier, association(s) stored in the profile can represent accessory stimulations, navigation, speech, the invocation of other software applications, macros or other suitable associations that result in substitute stimulations. The accessory stimulations can be stimulations that are generated by the computer mouse 172, as well as stimulations from other accessories (e.g., headset 114), or combinations thereof.

Figure 7A:
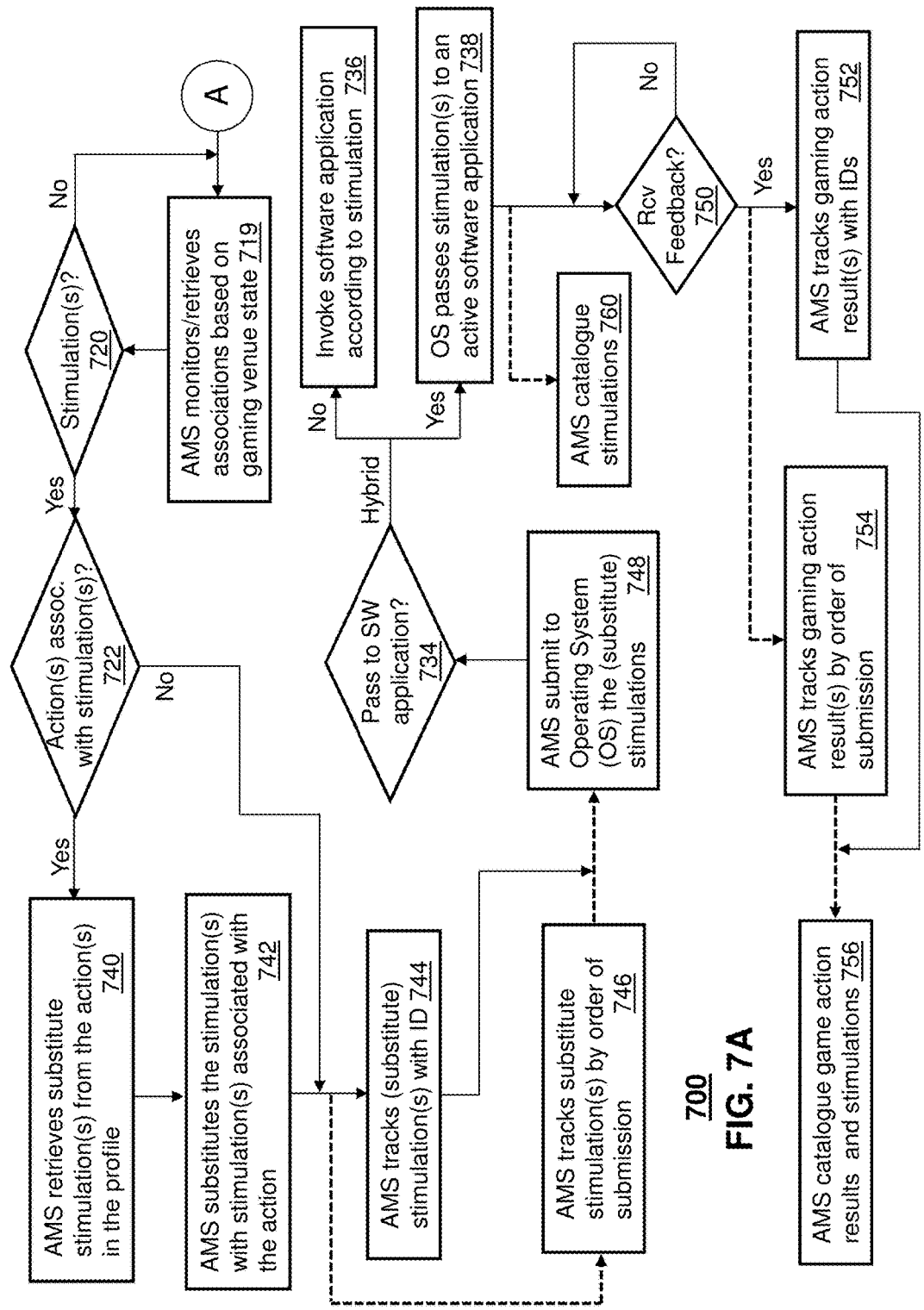
FIG. 7A depicts an illustrative embodiment of a fourth method utilized in the subject disclosure.
Figure 7B:
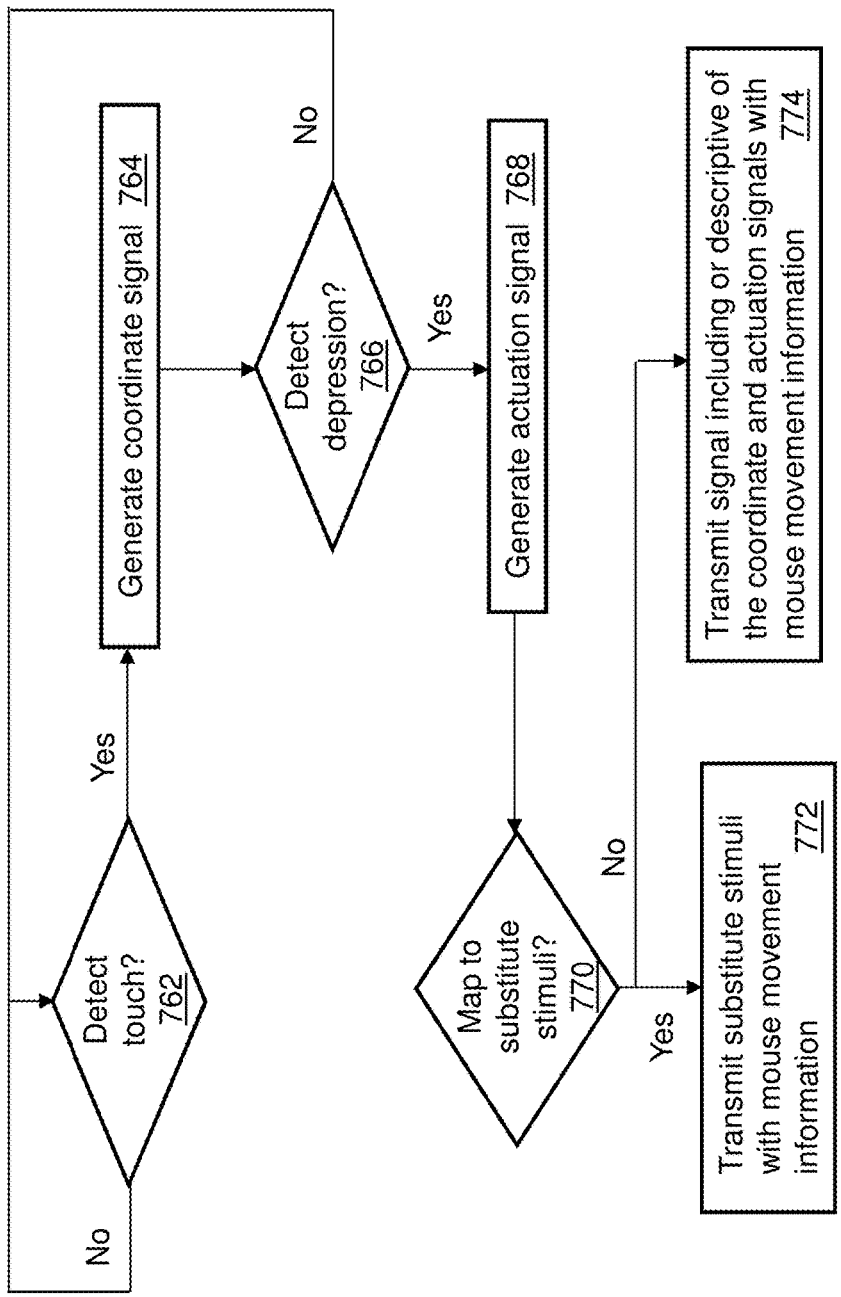
FIG. 7B depicts an illustrative embodiment of a fifth method utilized in the subject disclosure.

Once a profile and its contents have been retrieved in either of steps 614 or step 617, the AMS application can proceed to step 719 of FIG. 7A where it monitors for a change in a gaming venue state based on the presentations made by the gaming application, or by way of API messages supplied by the video game. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application.

The AMS application can monitor in step 720 stimulations generated by the accessories coupled to the desktop computer. The stimulations can be generated by the gamer by manipulating the computer mouse 172, and/or by generating speech commands detected by the headset 114. In the case of the computer mouse 172 of FIG. 2D, a stimulation can be generated according to the method of FIG. 7B. For example, at step 762 the touch-sensitive interface 202 can detect a user's finger touching the interface in one of the virtual regions (e.g., virtual region 252). Once detected, the capacitive sensor can generate a coordinate signal indicating which virtual region has been selected at step 764. Once the user depresses the left mechanical button 203, the micro switch 204 detects the depression at step 766 and generates an actuation signal 768.

If the computer mouse 172 is configured with a processor and memory with executable instructions, the processor can determine at step 770 if the computer mouse 172 has been configured by the AMS application with a profile comprising substitute stimuli. If so, the processor can proceed to step 772 where it transmits substitute stimuli selected from the profile in place of the coordinate and actuation signals. The processor also transmits in this step mouse movement information. If the computer mouse 172 has not be configured with to generate substitute stimuli, it proceeds to step 774 where it transmits a signal that includes or is descriptive of the coordinate and actuation signals with mouse movement information. In either instance of step 772 or step 774, the AMS application operating from the desktop computer processes the stimuli generated by the computer mouse 172 at step 720.

If a stimulation is detected at step 720, the AMS application can determine in step 722 whether to forward the detected stimulation(s) to an Operating System (OS) of the desktop computer without substitutions. This determination can be made by comparing the detected stimulation(s) to association in the profile of the computer mouse 172 (if the computer mouse 172 is not configured to make its own substitutions). If the detected stimulation(s) match the associations, then the AMS application proceeds to step 740 where it retrieves substitute stimulation(s) in the profile. In step 742, the AMS application can substitute the detected stimulation(s) with the substitute stimulations in the profile. In one embodiment, the AMS application can track in step 744 the substitute stimulations by updating these stimulations with a unique identifier such as a globally unique identifier (GUID). In this embodiment, the AMS application can also add a time stamp to each substitute stimulation to track when the substitution was performed.

Once the stimulations received in step 720 have been substituted with other stimulations in step 742, the AMS application can proceed to step 748 and submit the substitute stimulations to the OS of the gaming console 208. If, on the other hand, in step 722 the detected stimulation(s) do not match an association in the profile, then the AMS application proceeds to one of steps 744 or 746 in order to track the stimulations of the accessory. Once the AMS application has performed the necessary steps to track the stimulation as originally generated by the accessory, the AMS application proceeds to step 748 where it submits stimulations (with or without substitutions) to the OS of the desktop computer with or without tracking information.

In step 734, the OS determines whether to invoke in step 736 a software application identified in the stimulation(s) (e.g., gamer says "turn on team chat", which invokes a chat application), whether to forward the received stimulations to the gaming software application in step 738, or combinations thereof. Contemporaneous to the embodiments described above, the AMS application can monitor in step 750 for game action results supplied by the video game via a defined API. The game action results can be messages sent by the video game by way of the API of the video game to inform the AMS application what has happened as a result of the stimulations sent in step 738.

For instance, suppose the stimulation sent to the video game in step 738 is a command to shoot a pistol. The video game can determine that the shot fired resulted in a miss of a target. The video game can respond with a message which is submitted by way of the API to the AMS application that indicates the shot fired resulted in a miss. If IDs such as GUIDs were sent with each stimulation, the video game can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 752 to identify the stimulation having the same ID. If on other hand, the order of game action results can be maintained consistent with the order of the stimulations, then the AMS application can correlate in step 754 stimulations with game action results by the order in which stimulation were submitted and the order in which game action results were received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

From the foregoing descriptions, it would be evident to an artisan with ordinary skill in the art that the aforementioned embodiments can be modified, reduced, or enhanced without departing from the scope and spirit of the claims described below.

For instance, the touch-sensitive buttons of the computer mouse 172 can be mapped to other accessories. For example, touch-sensitive mouse button 232 of FIG. 2C can be remapped by the AMS application to the letter "f" of a keyboard accessory. Accordingly, each time the touch-sensitive mouse button 232 is touched and depressed, the AMS application substitutes the signal generated by the computer mouse 172 with the letter "f" according to the method of FIG. 7A. In another embodiment, the micro switch 204 of FIG. 2A can be removed so that a user no longer feels a tactile feedback of the switch, and consequently, an actuation signal would no longer be generated. Depression of the touch-sensitive button 232 can be detected by the amount of surface area sensed by the capacitive sensor. For instance if a user presses his/her finger on touch-sensitive button 232, the depression of the finger will cover a greater surface area and thus a depression can be determined.

A distinction can be made between a depression and a resting of a finger by the shape sensed by the capacitive sensor. For example, the capacitive sensor can sense a first surface area of the finger while the finger is resting on the capacitive sensor. The moment the user depresses the touch-sensitive mouse button 232, the surface area previously detected will expand. If the expansion occurs in the area of touch-sensitive mouse button 232, then a depression of this button can be said to have occurred. This approach can also be used to determine which touch-sensitive mouse button is being depressed when a user's finger is resting on more than one touch-sensitive mouse button.

In yet another embodiment, capacitive sensors can be placed on one or both side panels of the computer mouse 172 (not shown). Use of the side panels can be based on a swipe of the capacitive sensor, a depression detected with actuation of a micro switch, or a depression detected by a change in surface area detected.

The embodiments touch-sensitive buttons described above can also be applied to other accessories. For example, touch-sensitive buttons (with or without a micro switch) can be placed on a surface of a headset to activate or control functions of the headset or indirectly activate or control functions of other devices. For instance, a tap (or depression of a micro switch is used) of a touch-sensitive button of the headset can activate a team chat session. Touch-sensitive buttons can also be placed on one or more surfaces of a keyboard, a gaming controller, or other accessories that are used for controlling software applications such as a video game. The function of a touch-sensitive button can be mapped by the AMS application as described above.

Other suitable embodiments can be applied to the subject disclosure.

FIG. 8 depicts an exemplary diagrammatic representation of a machine in the form of a computer system 800 within which a set of instructions, when executed, may cause the machine to perform any one or more of the methods discussed above. One or more instances of the machine can operate as any of devices depicted in FIGS. 2-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A user input device, comprising:
   an adjustable, touch-sensitive interface;
   a processing system including a processor; and
   a memory that stores executable instructions that, when executed by the processing system, facilitate performance of operations, comprising:
   receiving, from a computing device communicatively coupled to the user input device, user input to identify a plurality of virtual regions of the adjustable, touch-sensitive interface to define a plurality of buttons, wherein the user input is received via a graphical user interface provided at the computing device, wherein the graphical user interface provides an illustration of the adjustable, touch-sensitive interface and the plurality of virtual regions;
   configuring the user input device according to the user input received from the computing device;
   receiving a coordinate signal from the adjustable, touch-sensitive interface;
   receiving an actuation signal from adjustable, touch-sensitive interface indicating that the adjustable, touch-sensitive interface has been depressed;
   determining a substitute stimuli based on the coordinate signal and the actuation signal; and
   providing the substitute stimuli to a software application.

2. The user input device of claim 1, wherein the user input includes an indication of the software application.

3. The user input device of claim 2, wherein the graphical user interface provides a selection of a plurality of software applications and wherein the indication of the software application is received via the graphical user interface provided at the computing device.

4. The user input device of claim 2, wherein the determining the substitute stimuli is further based on the indication of the software application.

5. The user input device of claim 1, wherein the determining a substitute stimuli comprises:
   determining a selected button of the plurality of buttons that corresponds to the coordinate signal when the actuation signal is received; and
   selecting the substitute stimuli that corresponds to the selected button.

6. The user input device of claim 1, wherein the configuring comprises subdividing the adjustable, touch-sensitive interface into a plurality of sectors, responsive to the user input defining the plurality of virtual regions, wherein each sector corresponds to a different button of the plurality of buttons.

7. The user input device of claim 6, wherein each button of the plurality of buttons corresponds to a different substitute stimuli of a plurality of substitute stimuli.

8. The user input device of claim 7, wherein the plurality of substitute stimuli is associated with the software application.

9. The user input device of claim 8, wherein the software application is selected from a plurality of software applications and wherein the plurality of substitute stimuli is different for each of the plurality of software applications.

10. The user input device of claim 1, wherein the adjustable, touch-sensitive interface comprises a capacitive sensor for detecting physical contact of the adjustable, touch-sensitive interface to provide the coordinate signal and a second sensor for detecting when the adjustable, touch-sensitive interface has been depressed to provide the actuation signal, wherein the capacitive sensor is divided into a plurality of electrically isolated regions, and wherein each of the plurality of electrically isolated regions corresponds to one of the plurality of virtual regions.

11. A non-transitory machine-readable storage medium, comprising executable instructions that, when executed by a processing system including a processor, facilitate performance of operations, comprising:
receiving user input to identify a plurality of virtual regions of an adjustable, touch-sensitive interface of a user input device to define a plurality of buttons, wherein the user input is received via a graphical user interface, wherein the graphical user interface provides an illustration of the adjustable, touch-sensitive interface and the plurality of virtual regions;
receiving a coordinate signal from the adjustable, touch-sensitive interface;
receiving an actuation signal from adjustable, touch-sensitive interface indicating that the adjustable, touch-sensitive interface has been depressed;
determining a substitute stimuli based on the coordinate signal and the actuation signal; and
providing the substitute stimuli to a software application.

12. The non-transitory machine-readable storage medium of claim 11, wherein the user input includes an indication of the software application.

13. The non-transitory machine-readable storage medium of claim 12, wherein the determining the substitute stimuli is further based on the indication of the software application.

14. The non-transitory machine-readable storage medium of claim 11, wherein the determining a substitute stimuli comprises:
determining a selected button of the plurality of buttons that corresponds to the coordinate signal when the actuation signal is received; and
selecting the substitute stimuli that corresponds to the selected button.

15. A method, comprising:
receiving user input defining a plurality of virtual regions for configuring a touch-sensitive interface of a user input device;
configuring the user input device according to the user input;
receiving a coordinate signal from the touch-sensitive interface;
receiving an actuation signal from touch-sensitive interface indicating that the touch-sensitive interface has been actuated;
determining a substitute stimuli for association with the coordinate signal and the actuation signal; and
in response to the receiving the coordinate signal and the receiving the actuation signal, providing the substitute stimuli to a software application.

16. The method of claim 15, wherein the configuring comprises subdividing the touch-sensitive interface into a plurality of sectors, responsive to the user input defining the plurality of virtual regions, wherein each sector corresponds to a different button of a plurality of buttons.

17. The method of claim 16, wherein each button of the plurality of buttons corresponds to a different substitute stimuli of a plurality of substitute stimuli.

18. The method of claim 17, wherein the plurality of substitute stimuli is associated with the software application.

19. The method of claim 18, wherein the software application is selected from a plurality of software applications and wherein the plurality of substitute stimuli is different for each of the plurality of software applications.

20. The method of claim 15, wherein the user input includes an indication of the software application.

* * * * *